(12) United States Patent
Koga et al.

(10) Patent No.: US 10,365,801 B2
(45) Date of Patent: Jul. 30, 2019

(54) USER INTERFACE EVALUATION DEVICE AND USER INTERFACE EVALUATION METHOD

(71) Applicant: TOYOTA JIDOSHA KABUSHIKI KAISHA, Toyota-shi, Aichi-ken (JP)

(72) Inventors: Ko Koga, Tokyo (JP); Masato Fujii, Tokyo (JP); Motohiro Nakamura, Okazaki (JP); Makoto Yamazaki, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 15/327,241

(22) PCT Filed: Jul. 9, 2015

(86) PCT No.: PCT/JP2015/069778
§ 371 (c)(1),
(2) Date: Jan. 18, 2017

(87) PCT Pub. No.: WO2016/013407
PCT Pub. Date: Jan. 28, 2016

(65) Prior Publication Data
US 2017/0160893 A1    Jun. 8, 2017

(30) Foreign Application Priority Data
Jul. 22, 2014   (JP) ................................. 2014-148912

(51) Int. Cl.
*G06F 3/048*    (2013.01)
*G06F 3/0484*   (2013.01)
(Continued)

(52) U.S. Cl.
CPC ............ *G06F 3/0484* (2013.01); *G06F 3/048* (2013.01); *G06F 8/38* (2013.01); *G06F 9/451* (2018.02); *G06F 11/34* (2013.01)

(58) Field of Classification Search
CPC .......... G06F 3/0484; G06F 11/34; G06F 8/38; G06F 9/451; G06F 3/048
See application file for complete search history.

(56) References Cited

U.S. PATENT DOCUMENTS

2011/0173552 A1* 7/2011 Ikegami .................... G06F 8/38
715/765
2013/0179121 A1* 7/2013 Yamaguchi ............. G06F 17/18
702/181

FOREIGN PATENT DOCUMENTS

JP    H08-241191 A    9/1996
JP    2013-097616 A   5/2013

OTHER PUBLICATIONS

Department of Transportation, Distraction NPFG-02162012, National Highway Traffic Safety Administration (Year: 2012).*

* cited by examiner

*Primary Examiner* — Matthew Ell
*Assistant Examiner* — Zelalem W Shalu
(74) *Attorney, Agent, or Firm* — Oliff PLC

(57) ABSTRACT

A user interface evaluation device comprises a design information acquisition unit configured to acquire information on a plurality of components arranged on a user interface screen of the software; a component recognition resource acquisition unit configured to acquire, for each component, component recognition resources which are resources required for recognizing the respective components; and a conformity probability estimation unit configured to calculate, using a probability density function with a total sum of the acquired component recognition resources as a random variable, (Continued)

conformity probability which is a probability that necessary recognition resources which are resources required for recognizing information output on the user interface screen meet predetermined requirements.

5 Claims, 8 Drawing Sheets

(51) Int. Cl.
    *G06F 9/451* (2018.01)
    *G06F 8/38* (2018.01)
    *G06F 11/34* (2006.01)

FIG. 3

| RESOURCE DATA | | |
|---|---|---|
| CLASS NAME | TYPE | COMPONENT RECOGNITION RESOURCE [SECOND] |
| Tab | STANDARD | R_Tab |
| TabScrollIndicator | STANDARD | R_TabScrollIndicator |
| TitleImageView | STANDARD | R_TitleImageView |
| TitleNumber | STANDARD | R_TitleNumber |
| TimeStamp | STANDARD | R_TimeStamp |
| ScrollbarIndicator | STANDARD | R_ScrollbarIndicator |
| ExImageView | CASTOM | R_ExImageView |
| VolumeControl | STANDARD | R_VolumeControl |
| ExButton | CASTOM | R_ExButton |
| RepeatButton | STANDARD | R_RepeatButton |
| RandomButton | STANDARD | R_RandomButton |
| Button | STANDARD | R_Button |

| CLASS NAME | TYPE | NUMBER | COMPONENT RECOGNITION RESOURCE [SECOND] |
|---|---|---|---|
| Tab | STANDARD | 1 | R_Tab |
| TabScrollIndicator | STANDARD | 2 | R_TabScrollIndicator |
| TitleImageView | STANDARD | 3 | R_TitleImageView |
| TitleNumber | STANDARD | 1 | R_TitleNumber |
| TimeStamp | STANDARD | 1 | R_TimeStamp |
| ScrollbarIndicator | STANDARD | 2 | R_ScrollbarIndicator |
| ExImageView | CUSTOM | 1 | R_ExImageView |
| VolumeControl | STANDARD | 1 | R_VolumeControl |
| ExButton | CUSTOM | 1 | R_ExButton |
| RepeatButton | STANDARD | 1 | R_RepeatButton |
| RandomButton | STANDARD | 1 | R_RandomButton |
| Button | STANDARD | 1 | R_Button |
| TOTAL SUM | | 18 | 2.5 [Sec] |

FIG. 4

USER INTERFACE EVALUATION DEVICE AND USER INTERFACE EVALUATION METHOD

TECHNICAL FIELD

The present invention relates to a device that evaluates a software user interface.

BACKGROUND ART

In recent years, a variety of software that operate on a computer (an onboard terminal) mounted on a vehicle have been developed. When various applications such as a route guidance application or a media player application are operated on an onboard terminal, it is possible to collect information, provide amusement, etc. during travel.

Meanwhile, drivers are likely to view the screen of an onboard terminal while driving, so a GUI output on the screen desirably has a design which does not distract the users' driving does not cause a decrease in the users' concentration). Specific contents are defined in "Driver Distraction Guidelines for In-Vehicle Electronic Devices" issued by National Highway Traffic Safety Administration (NHTSA), for example.

Further, a GUI evaluation device disclosed in PTL 1, for example known as a technique for checking whether a design target GUI is designed according to predetermined guidelines.

CITATION LIST

Patent Literature

[PTL 1] Japanese Patent Application Publication No. H08-241191

SUMMARY OF INVENTION

Technical Problem

A particularly important point in designing software executed by an onboard terminal is the amount of time it takes for a person to recognize a series of information output on one screen. For example, the guidelines above stipulate a requirement that "eye glance duration must be 2 seconds or less".

However, the time required for recognizing information displayed on a screen changes depending on an arrangement position, the number, the size, and the like of components arranged on the screen, so it is impossible to set a uniform evaluation standard for a development environment. That is to say, it cannot be known whether the designed GUI would conform to the guidelines or not, until a test is performed on an actual device.

With the foregoing in view, it is an object of the present invention to provide a user interface evaluation device that estimates whether resources required for a person to recognize a display content of a screen (picture) output by target software meet predetermined requirements.

Solution to Problem

The present invention in its one aspect provides a user interface evaluation device that evaluates whether resources required for a person to recognize a content of a picture output by target software meet predetermined requirements, the user interface evaluation device comprising a design information acquisition unit configured to acquire information on a plurality of components arranged on a user interface screen of the software; a component recognition resource acquisition unit configured to acquire, for each component, component recognition resources which are resources required for recognizing the respective components; and a conformity probability estimation unit configured to calculate, using a probability density function with a total sum of the acquired component recognition resources as a random variable, conformity probability which is a probability that necessary recognition resources which are resources required for recognizing information output on the user interface screen meet predetermined requirements.

The design information acquisition unit is a unit configured to acquire information on components arranged on a user interface screen of target software. The components are components for inputting and outputting information, such as labels, list boxes, buttons, or the like, for example. The targets may be arbitrary as long as the targets are arranged on the user interface screen.

Moreover, the component recognition resource acquisition unit is a unit configured to acquire resources (component recognition resources) required for recognizing the respective components. Recognition in this case means confirmation of component contents through visual recognition. The component recognition resources can be represented by time, for example.

Moreover, the conformity probability estimation unit is a unit configured to calculate a probability that resources required for recognizing the entire screen meet predetermined requirements (for example, the time determined in guidelines) based on a total sum of the acquired component recognition resources. As described above, since the resources required for recognizing the entire screen change depending on the design or the content of the screen, it is very difficult for a device to evaluate whether the software is conformable to the requirements. Therefore, the user interface evaluation device according to the present invention uses a total sum of the component recognition resources as a random variable and uses the probability density function to calculate a probability serving as a reference for determining whether the software is conformable to the requirements.

According to such a configuration, whether resources required for recognizing the entire interface screen output by the target software meet predetermined requirements can be estimated with a simple process.

Also, a probability distribution of the probability density function may be a normal distribution of which the central value is a value corresponding to the predetermined requirements. By this configuration, it is possible to calculate the conformity probability with higher accuracy.

Also, the conformity probability estimation unit may set a standard deviation of the probability distribution according to evaluation target software.

The standard deviation of the probability distribution to be used for estimation may be selected according to the characteristics of the target software. For example, different values may be used for respective categories (for example, genres, types, or characteristics) of the software. By using different requirements for respective items of software, it is possible to obtain more accurate estimation results.

Also, the component recognition resources and the necessary recognition resources may be time required for a person to recognize a target.

The sent invention can be ideally used for a device that evaluates whether the time required for a user to recognize information displayed on a screen meets predetermined requirements.

The present invention can be specified as a user interface evaluation device including at least some of the above-described processes. The present invention can be also specified as a user interface evaluation method executed by the user interface evaluation device. The above-described processes and units can be also implemented in freely selected combinations, provided that it causes no technical contradictions.

Advantageous Effects of Invention

According to the present invention, it is possible to provide a user interface evaluation device that estimates whether resources required for a person to recognize a display content of a screen (picture) output by target software meet predetermined requirements.

BRIEF DESCRIPTION OF DRAWINGS

FIG. 3 is an example of resource data according to the first embodiment.

FIG. 4 is an example of calculating the sum of component recognition resources.

DESCRIPTION OF EMBODIMENTS

First Embodiment

<System Configuration>

Figure 1:
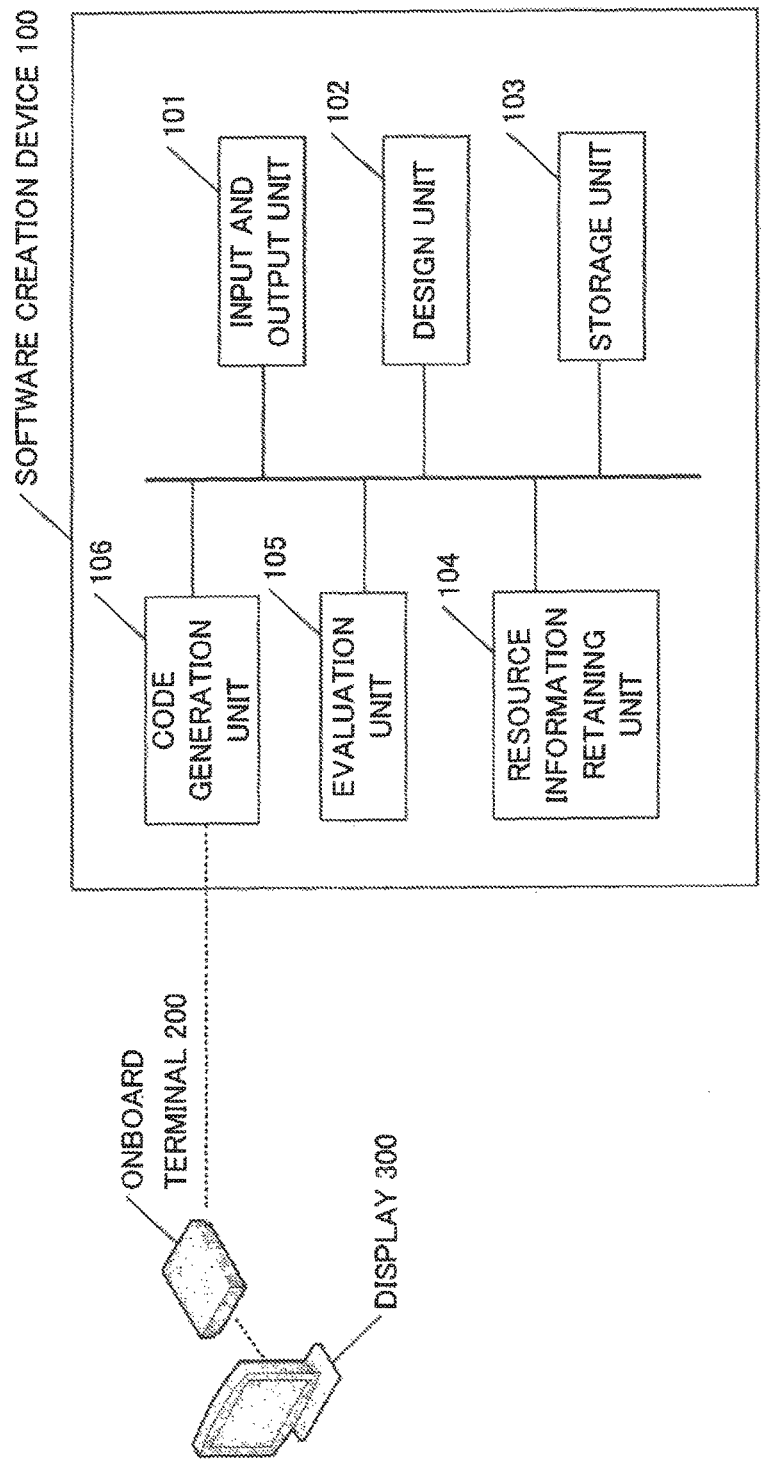
FIG. 1 is a configuration diagram of a software creation device according to a first embodiment.

A user interface evaluation device according to a first embodiment is a device (a software creation device 100) having a function of creating software that operates on an onboard terminal 200 and a function of evaluating a user interface of the software. The software creation device 100 according to the first embodiment will be described with reference to FIG. 1.

The software creation device 100 is a computer having a processor, a main storage device, and an auxiliary storage device (which are not illustrated in the drawing). A program stored in the auxiliary storage device is loaded on the main storage device and is executed by the processor whereby respective units (to be described later) perform their functions.

The onboard terminal 200 is a software development target device and is an onboard computer mounted on a vehicle. The onboard terminal 200 has a display 300 and can output a software execution screen on the display.

Next, the software creation device 100 will be described. The software creation device 100 includes an input and output unit 101, a design unit 102, a storage unit 103, a resource information retaining unit 104, an evaluation unit 105, and a code generation unit 106.

The input and output unit 101 is a unit configured to receive an input operation performed by a user and presents information to the user. For example, the input and output 101 is configured from a liquid crystal display, a keyboard, a mouse, and the like and a control unit therefor.

The design unit 102 is a unit configured to design software. Specifically, the design unit presents a screen (for example, a code editor or a screen editor) for designing software to a software developer through the input and output unit 101 and acquires software design data input by the developer. The software design data includes design data (hereinafter referred to as GUI design data) of a user interface screen and design data for logic.

Figure 2:
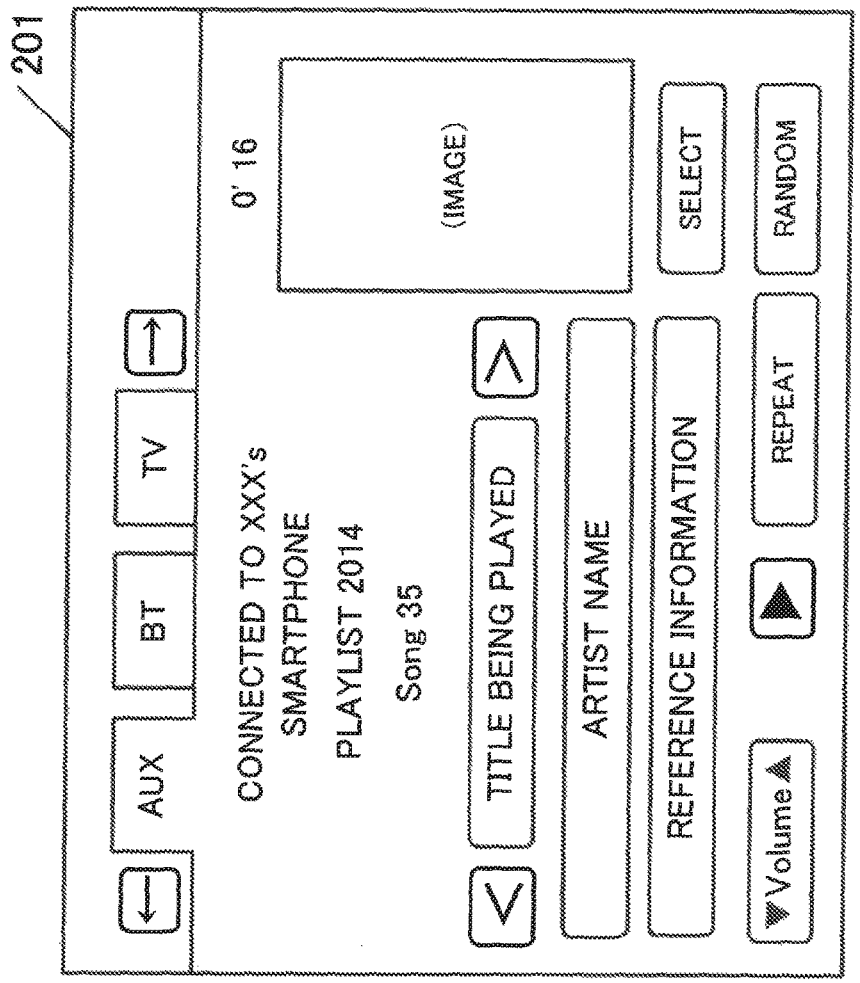
FIG. 2 is an example of a user interface screen according to the first embodiment.

The GUI design data is data indicating the arrangement of elements (hereinafter components) arranged on the user interface screen (hereinafter a form) of development target software. FIG. 2 illustrates an arrangement example of components. In this example, a plurality of labels (character regions), buttons, images, and the like are arranged on a form 201. In this example, although labels, buttons, and images are illustrated as the components, the components may be arbitrary elements as long as the elements are arranged on a screen. For example, the components may be a list box, a select box, a check box, and the like.

A software developer arranges components on the form through an editor screen generated by the design unit 102. Moreover, similarly, the developer performs coding of logic through an editor screen generated by the design unit 102.

When software is executed, the components arranged on the form in this manner operate according to the designed logic. The design data acquired by the design unit 102 is temporarily stored in the storage unit 103 as text file in which codes are described and an XML file that represents a screen design, for example.

The storage unit 103 is a unit configured to temporarily store data related to the design of software. High-speed data read and write can be performed on the storage unit 103 and a large-capacity storage medium is preferably used. For example, a flash memory or the like can be ideally used.

The resource information retaining unit 104 is a unit configured to retain information on resources required for a user to visually recognize the components arranged on the form. More specifically, the time required for recognizing (that is, understanding the content of) a target component is stored in advance for each class of components as a "component recognition resource".

FIG. 3 is an example of data in which a class name of a component and a component recognition resource (in second units) are correlated in a table form. A character string illustrated in a "component recognition resource" field in FIG. 3 is a constant, and a numerical value such as "R_Tab=0.1 [sec]" is allocated.

The evaluation unit 105 is a unit configured to calculate a probability that the user interface screen of software being designed is conformable to predetermined requirements based on the GUI design data acquired by the design unit 102 and the resource data stored in the resource information retaining unit 104. The content of the predetermined requirements and a specific calculation method will be described later.

The code generation unit 106 is a unit configured to build (generate) an executable program based on the software design data (codes) acquired by the design unit 102. The built program is finally output as a distributable software package. The code generation unit 106 may also have a function of transmitting the software package to the onboard terminal 200 via a cable connection or a wireless connection.

<Interface Evaluation Method>

Next, the requirements that design target software has to meet will be described. The requirements mentioned in the present embodiment are requirements (hereinafter referred to as recognition requirements) on the time required for a user (for example, a driver of a vehicle) having seen the form to recognize the content when the form was displayed on the display 300. In the first embodiment, a value such as "2.0 seconds or smaller" is used as the recognition requirements. This value is a value determined based on cognitive psychology experiments or the like.

Here, "recognize an entire screen" means that a user may not recognize all items of displayed information but may recognize at least information that is to be delivered in the screen. For example, when a target is a musical piece selection screen of a music player, the user may not accurately understand all of a title, an album name, and an artist name but may recognize the musical piece being displayed.

The time required for recognize the information displayed on the screen may be obtained by calculating the time required for recognizing each of a plurality of components arranged on the screen and adding up the calculated time. However, since a user does not recognize the displayed components one by one, it is impossible to determine whether the software is conformable to the recognition requirements using a simple total sum only.

For example, even when it takes a total of approximately five seconds to recognize all components arranged on the screen, if information necessary for the user is at the center of the screen and information that is not important is at the periphery of the screen, the user may be able to recognize the information displayed on the screen within two seconds.

Conversely, even when the total sum of the time required for recognizing the respective arranged components is two seconds or less, it may still be impossible, depending on the design of the screen, to recognize the information displayed on the screen within two seconds. For example, such a case corresponds to a situation where the driver has to move his or her eyes in a complicated manner so as to view items of important information displayed at distant positions.

Therefore, the software creation device according to the present embodiment defines the time required for recognizing each of components arranged on a form and outputs a probability that target software is conformable to the above-described recognition requirements as a numerical value based on the total sum of the time.

In the first embodiment, the probability that the target software is conformable to the recognition requirements is calculated by executing the following steps.

(1) Acquire Time Required for Recognizing Each Component

First, a plurality of components arranged on a form of target software is specified and the total sum of resources required for recognizing the plurality of components is acquired by referring to resource data. In this example, as illustrated in FIG. 4, 18 components are arranged on the form and the total sum (hereinafter a total recognition resource) of component recognition resources of the 18 components is 2.5 seconds.

(2) Calculate Probability Using Probability Density Function

Figure 5:
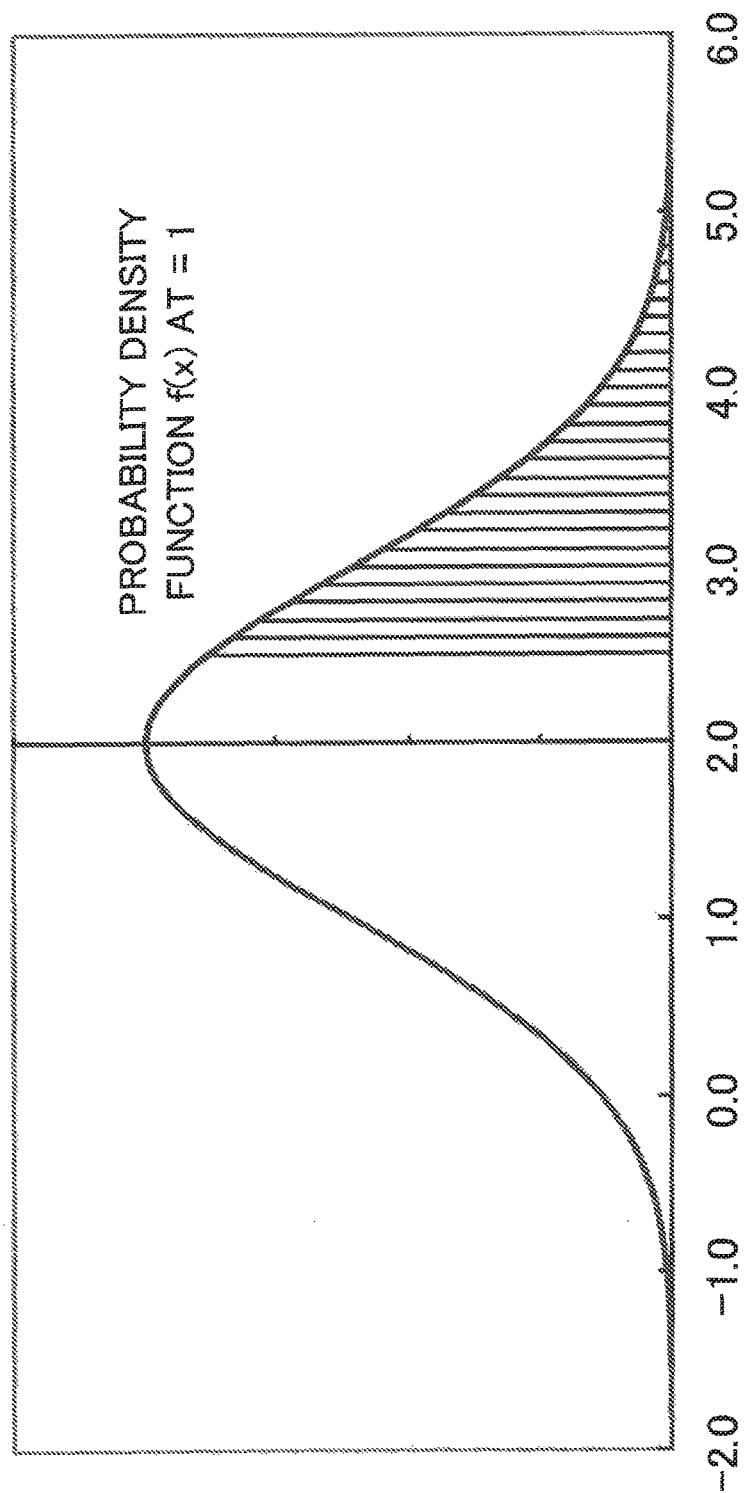
FIG. 5 is an example of a probability density function according to the first embodiment.

Subsequently, a probability is calculated using the calculated total recognition resource and a probability density function. A probability distribution of the probability density function used in the present embodiment is such a normal distribution as illustrated in FIG. 5. The horizontal axis represents time and the central value is the time (that is, 2.0 [sec]) corresponding to the recognition requirements. Moreover, an estimated probability P when the total recognition, resource is used as a random variable is acquired. The estimated probability P can be obtained by Expression 1. Here, R is the total recognition resource [sec] and S is the central value (2.0 [sec]) of the probability distribution. In the present embodiment, σ=1.

$$P = 1 - \frac{1}{\sqrt{2\pi}\,\sigma} \int_{-\infty}^{R} \exp\left(-\frac{(x-S)^2}{\sigma^2}\right) dx \qquad \text{[Math. 1]}$$

When the estimated probability P is calculates according to the above-described condition, a value 0.3085 . . . is obtained. That is, a probability that the user interface screen of the target software is conformable to recognition requirements that "the entire screen can be recognized within 2.0 seconds" is approximately 31%.

In the software creation device according to the present embodiment, as described above, a probability that the time required for recognizing the entire screen is conformable to the requirements is calculated using resources required for recognizing arranged components and the probability density function.

Figure 6:
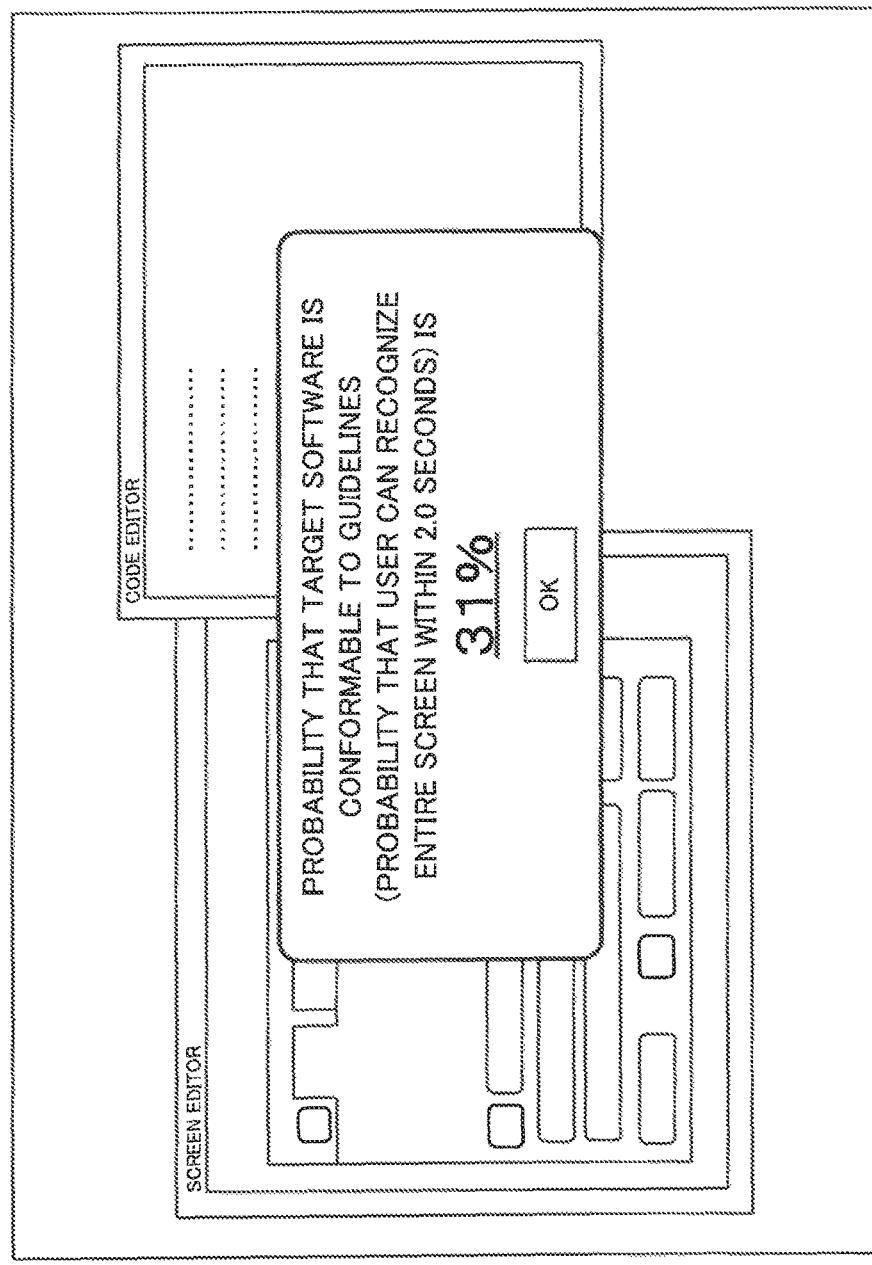
FIG. 6 is an example of a result display screen according to the first embodiment.

The calculated conformity probability is presented to the software developer through the input and output unit 101. For example, the conformity probability may be output via a dialog as illustrated in FIG. 6 and may be output on a console screen. Moreover, the conformity probability may be output to a log.

<Process Flowchart>

Next, a process flowchart for realizing the above-described functions will be described.

Figure 7:
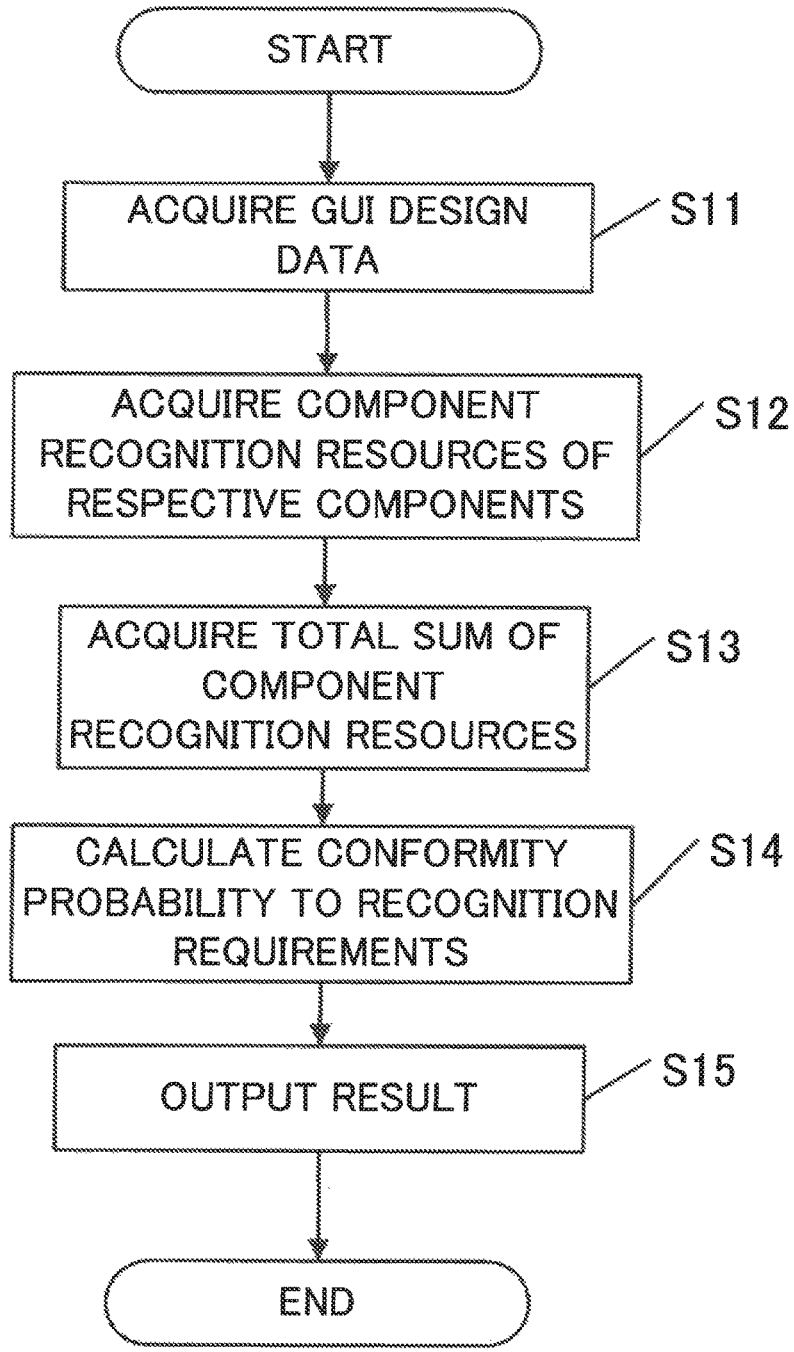
FIG. 7 is a process flowchart according to the first embodiment.

FIG. 7 is a flowchart of an evaluation process performed by the software creation device according to the present embodiment. This process is executed by the evaluation unit 105 based on the user's instruction (for example, at a timing at which a checking function in a development environment is activated).

First, in step S11, the GUI design data acquired by the design unit 102 is acquired.

Subsequently, in step S12, the resource data stored in the resource information retaining unit 104 is acquired and compared with the stored GUI design data to acquire component recognition resources corresponding to the plurality of arranged components. Subsequently, in step S13, the acquired component recognition resources are added up to acquire a total recognition resource.

Subsequently, in step S14, a conformity probability to the recognition requirements is calculated according to the above-described method using the probability density function and the total recognition resource. In step S15, the calculation result is presented to the user.

As described above, according to the first embodiment, it is possible to estimate how much the software is conformable to the recognition requirements on a development environment for developing the software. That is, since the conformity to the recognition requirements can be determined without performing a test on an actual device, it is possible to reduce the number of steps such as a return or the like due to a failure in a test on the actual device.

Second Embodiment

Figure 8:
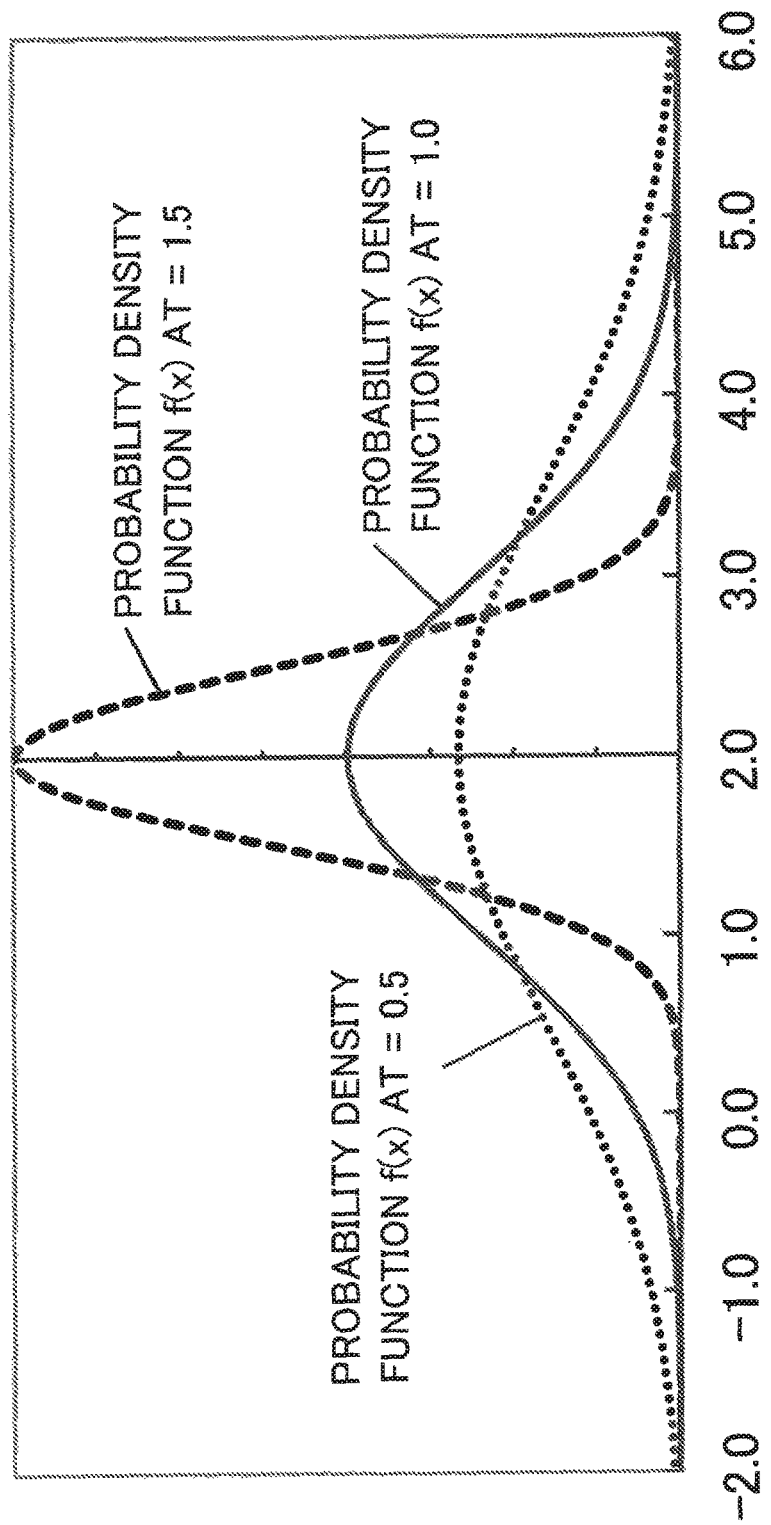
FIG. 8 is an example of a probability density function according to a second embodiment.

In the first embodiment, the conformity probability to the recognition requirements is calculated using a normal distribution of which the standard deviation σ is 1. However, it cannot be said that the standard deviation optimal for calculating the conformity probability is always 1. FIG. 8 is a diagram for describing a probability distribution when the standard deviation is not 1. For example, even when the total sum of the component recognition resources greatly deviates from a reference value (for example, 2.0 seconds) depending on the characteristics of software, the software may meet the recognition requirements. In such a case, the probability density function is flat as in the case of σ=0.5. Moreover, in a reverse case, the probability density function has a protruding shape as in the case of σ=1.5.

In the second embodiment, in order to cope with such a case, the value of a standard deviation σ to be used is determined according to target software.

Since a software creation device according to the second embodiment has the same configuration as that of the first embodiment, the description thereof will not be provided and different processes only will be described.

In the second embodiment, in step S14, a process determining the standard deviation σ in Expression 1 is added. The standard deviation σ is determined based a stored measurement value (test data of the time required for actually recognizing the entire screen) for each category of the target software, for example.

For example, the value σ at which best estimation accuracy is obtained may be calculated for each category of the software and be stored as preset data. Alternatively, the measurement values themselves may be stored and the value σ at which best estimation accuracy is obtained may be determined for the category of the software whenever the measurement is performed.

The category of the software may be arbitrary as long as it is the classification result of the software. For example, the category may be the genre of the software and may be the result classified based on the number and the arrangement of components on the form.

According to the second embodiment, by determining the standard deviation to be used for calculating the estimated probability for each category of the software, it is possible to obtain more accurate estimation results.

Modification

The above-described embodiments are exemplary embodiments explained to illustrate the present invention, and the present invention can be implemented by appropriately changing or combining the embodiments without departing from the scope of the invention.

For example, in the respective embodiments, although a function of which the probability distribution is a normal distribution is used, a distribution other than the normal distribution may be used.

REFERENCE SIGNS

100: Software creation device
101: Input and output unit
102: Design unit
103: Storage unit
104: Resource information retaining unit
105: Evaluation unit
106: Code generation unit
200: Onboard terminal
300: Display

The invention claimed is:

1. A user interface evaluation device that evaluates whether resources required for a person to recognize information displayed by target software satisfies predetermined requirements, the user interface evaluation device comprising:
　a storage storing, for each component of a plurality of components arranged on a user interface screen, a plurality of software codes and a predetermined time period required for recognizing each component of the plurality of components; and
　a processor programmed to:
　acquire the plurality of software codes from the storage;
　acquire the predetermined time period required for recognizing each component from the storage;
　calculate a conformity probability value based on a probability density function in which a total sum of the predetermined time period required for recognizing each component of all of the plurality of components is set as a variable, the conformity probability value being a probability that a total time required for recognizing the information displayed on the user interface screen satisfies the predetermined requirements for the person to recognize the information;
　　display the calculated conformity probability value on a display; and
　　when the calculated conformity probability value satisfies the predetermined requirements, build the target software based on the software codes of the plurality of components to generate the information for display to the person.

2. The user interface evaluation device according to claim 1, wherein
　a probability distribution of the probability density function is a normal distribution of which a central value is a value corresponding to the predetermined requirements.

3. The user interface evaluation device according to claim 2, wherein the processor is programmed to set a standard deviation of the probability distribution according to the target software.

4. A user interface evaluation method performed by a user interface evaluation device that evaluates whether resources required for a person to recognize information displayed by target software satisfies predetermined requirements, the user interface evaluation method comprising:
　storing, for each component of a plurality of components arranged on a user interface screen, a plurality of software codes and a predetermined time period required for recognizing each component of the plurality of components in a storage;
　acquiring the plurality of software codes from the storage;
　acquiring the predetermined time period required for recognizing each component from the storage;
　calculating a conformity probability value based on a probability density function in which a total sum of the predetermined time period required for recognizing each component of all of the plurality of components is set as a variable, the conformity probability value being a probability that a total time required for recognizing the information displayed on the user interface screen satisfies the predetermined requirements for the person to recognize the information and
　displaying the calculated conformity probability value on a display; and
　when the calculated conformity probability value satisfies the predetermined requirements, building the target software based on the software codes of the plurality of components to generate the information for display to the person.

5. A non-transitory computer readable storing medium recording a computer program for causing a computer to perform the user interface evaluation method according to claim 4.

* * * * *